US012632572B2

(12) United States Patent
Zhang et al.

(10) Patent No.: US 12,632,572 B2
(45) Date of Patent: \*May 19, 2026

(54) MACHINE LEARNING-BASED ENCRYPTED FILE CLASSIFICATION FOR IDENTIFYING ENCRYPTED DATA MOVEMENT

(71) Applicant: Netskope, Inc., Santa Clara, CA (US)

(72) Inventors: Yi Zhang, Santa Clara, CA (US); Siying Yang, Saratoga, CA (US); Yihua Liao, Palo Alto, CA (US); Dagmawi Mulugeta, London (GB); Raymond Joseph Canzanese, Jr., Philadelphia, PA (US); Ari Azarafrooz, Rancho Santa Margarita, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,277

(22) Filed: Feb. 23, 2024

(65) Prior Publication Data

US 2024/0249005 A1 Jul. 25, 2024

Related U.S. Application Data

(63) Continuation of application No. 17/860,037, filed on Jul. 7, 2022, now Pat. No. 11,947,682.

(51) Int. Cl.
| | |
|---|---|
| *G06F 21/60* | (2013.01) |
| *G06F 9/54* | (2006.01) |
| *H04L 41/16* | (2022.01) |

(52) U.S. Cl.
CPC ............ *G06F 21/602* (2013.01); *G06F 9/547* (2013.01); *H04L 41/16* (2013.01)

(58) Field of Classification Search
CPC ....... G06F 21/602; G06F 9/547; H04L 41/16; H04L 63/1425
See application file for complete search history.

(56) References Cited

U.S. PATENT DOCUMENTS

| | | |
|---|---|---|
| 5,440,723 A | 8/1995 | Arnold et al. |
| 6,513,122 B1 | 1/2003 | Magdych et al. |

(Continued)

FOREIGN PATENT DOCUMENTS

| | | |
|---|---|---|
| EP | 1063833 A2 | 12/2000 |

OTHER PUBLICATIONS

Cha, S., Kim, H., "Detecting Encrypted Traffic: A Machine Learning Approach", International Workshop on Information Security Applications 2016, pp. 54-65. [retrieved on May 31, 2023], from the internet: <URL: https://link.springer.com/chapter/10.1007/978-3-319-56549-1_5#chapter-info> (Year: 2017).*

(Continued)

*Primary Examiner* — Sangseok Park

(57) ABSTRACT

The disclosed technology facilitates User and Entity Behavior Analytics (UEBA) by classifying a file being transferred as encrypted or not. The technology involves monitoring movement of a files by a user over a wide area network, detecting file encryption for the files using a trained classifier, wherein the detecting includes processing by the classifier some or all of the following features extracted from each of the files: a chi-square randomness test; an arithmetic mean test; a serial correlation coefficient test; a Monte Carlo-Pi test; and a Shannon entropy test, counting a number of the encrypted files moved by the user in a predetermined period, comparing a predetermined maximum number of encrypted files allowed in the predetermined period to the count of the encrypted files moved by the user and detecting that the user has moved more encrypted files than the predetermined maximum number, and generating an alert.

20 Claims, 7 Drawing Sheets

(56) References Cited

U.S. PATENT DOCUMENTS

| | | | |
|---|---|---|---|
| 6,622,248 B1 | 9/2003 | Hirai | |
| 7,080,408 B1 | 7/2006 | Pak et al. | |
| 7,298,864 B2 | 11/2007 | Jones | |
| 7,376,719 B1 | 5/2008 | Shafer et al. | |
| 7,735,116 B1 | 6/2010 | Gauvin | |
| 7,966,654 B2 | 6/2011 | Crawford | |
| 8,000,329 B2 | 8/2011 | Fendick et al. | |
| 8,296,178 B2 | 10/2012 | Hudis et al. | |
| 8,793,151 B2 | 7/2014 | DelZoppo et al. | |
| 8,839,417 B1 | 9/2014 | Jordan | |
| 8,893,278 B1* | 11/2014 | Chechik | G06F 21/56 |
| | | | 713/188 |
| 9,197,601 B2 | 11/2015 | Pasdar | |
| 9,225,734 B1 | 12/2015 | Hastings | |
| 9,231,968 B2 | 1/2016 | Fang et al. | |
| 9,280,678 B2 | 3/2016 | Redberg | |
| 9,811,662 B2 | 11/2017 | Sharpe et al. | |
| 10,084,825 B1 | 9/2018 | Xu | |
| 10,237,282 B2 | 3/2019 | Nelson et al. | |
| 10,334,442 B2 | 6/2019 | Vaughn et al. | |
| 10,382,468 B2 | 8/2019 | Dods | |
| 10,484,334 B1 | 11/2019 | Lee et al. | |
| 10,826,941 B2 | 11/2020 | Jain et al. | |
| 11,032,301 B2 | 6/2021 | Mandrychenko et al. | |
| 11,036,856 B2 | 6/2021 | Graun et al. | |
| 11,281,775 B2 | 3/2022 | Burdett et al. | |
| 2002/0099666 A1 | 7/2002 | Dryer et al. | |
| 2003/0055994 A1 | 3/2003 | Herrmann et al. | |
| 2003/0063321 A1 | 4/2003 | Inoue et al. | |
| 2003/0172292 A1 | 9/2003 | Judge | |
| 2003/0204632 A1 | 10/2003 | Willebeek-Lemair et al. | |
| 2004/0015719 A1 | 1/2004 | Lee et al. | |
| 2005/0010593 A1 | 1/2005 | Fellenstein et al. | |
| 2005/0271246 A1 | 12/2005 | Sharma et al. | |
| 2006/0156401 A1 | 7/2006 | Newstadt et al. | |
| 2007/0204018 A1 | 8/2007 | Chandra et al. | |
| 2007/0237147 A1 | 10/2007 | Quinn et al. | |
| 2008/0069480 A1 | 3/2008 | Aarabi et al. | |
| 2008/0134332 A1 | 6/2008 | Keohane et al. | |
| 2009/0144818 A1 | 6/2009 | Kumar et al. | |
| 2009/0249470 A1 | 10/2009 | Litvin et al. | |
| 2009/0300351 A1 | 12/2009 | Lei et al. | |
| 2010/0017436 A1 | 1/2010 | Wolge | |
| 2011/0119481 A1 | 5/2011 | Auradkar et al. | |
| 2011/0145594 A1 | 6/2011 | Jho et al. | |
| 2012/0278896 A1 | 11/2012 | Fang et al. | |
| 2013/0159694 A1 | 6/2013 | Chiueh et al. | |
| 2013/0298190 A1 | 11/2013 | Sikka et al. | |
| 2013/0347085 A1 | 12/2013 | Hawthorn et al. | |
| 2014/0013112 A1 | 1/2014 | Cidon et al. | |
| 2014/0068030 A1 | 3/2014 | Chambers et al. | |
| 2014/0068705 A1 | 3/2014 | Chambers et al. | |
| 2014/0259093 A1 | 9/2014 | Narayanaswamy et al. | |
| 2014/0282843 A1 | 9/2014 | Buruganahalli et al. | |
| 2014/0359282 A1 | 12/2014 | Shikfa et al. | |
| 2014/0366079 A1 | 12/2014 | Pasdar | |
| 2015/0100357 A1 | 4/2015 | Seese et al. | |
| 2016/0323318 A1 | 11/2016 | Terrill et al. | |
| 2016/0350145 A1 | 12/2016 | Botzer et al. | |
| 2017/0064005 A1 | 3/2017 | Lee | |
| 2017/0093917 A1 | 3/2017 | Chandra et al. | |
| 2017/0250951 A1 | 8/2017 | Wang et al. | |
| 2019/0093187 A1 | 3/2019 | Lee et al. | |
| 2020/0034537 A1* | 1/2020 | Chen | G06F 16/128 |
| 2020/0036747 A1* | 1/2020 | Humphries | H04L 63/10 |
| 2020/0050686 A1 | 2/2020 | Kamalapuram et al. | |
| 2020/0097653 A1 | 3/2020 | Mehta et al. | |
| 2021/0044604 A1 | 2/2021 | Annen et al. | |
| 2021/0192361 A1* | 6/2021 | Mumme | G06N 20/20 |
| 2022/0269807 A1 | 8/2022 | Gehtman et al. | |
| 2022/0327098 A1* | 10/2022 | Cooper | G06F 21/554 |
| 2023/0007023 A1 | 1/2023 | Andrabi et al. | |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

Mccullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-, What are the different email protocols%3F,and also has defined functions.

NIIT, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet, FortiOS—Administration Guide, (Versions 6.4.0), Jun. 3, 2021, 1638 pgs.

(56) References Cited

OTHER PUBLICATIONS

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al., "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&P. 2000, May 2000, pp. 44-55.

Dean, Tamara, Guide to Telecommunications Technology, Course Technology, 2003, 5 pgs.

U.S. Appl. No. 60/520,577, "Device, System, and Method for Defending a Computer Network," Nov. 17, 2003, 21 pgs.

U.S. Appl. No. 60/552,457, "Fortinet Security Update Technology," Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

U.S. Appl. No. 17/860,035 Non-Final Office Action mailed on Jan. 22, 2024, 24 pages.

U.S. Appl. No. 17/860,035 Final Office Action mailed on Apr. 18, 2024, 27 pages.

Goldstein, Michael, "Statistical Tests for Random Number Generators," http://blog.mgold.io/2015/02/17/statistical-tests-for-random-number-generators. 17 February 20215. 16 pages.

Lee et al. "Machine Learning Based File Entropy Analysis for Ransomware Detection in Backup Systems." IEEE Access, vol. 7, Jul. 25, 2019, pp. 110205-110215.

Hsu et al. "Enhancing File Entropy Analysis to Improve Machine Learning Detection Rate of Ransomware." IEEE Access, vol. 9, Sep. 20, 2021, pp. 138345-138351.

Natekin,"Gradient boosting machines, a tutorial." Frontiers in Neurorobotics, vol. 7, Article 21, Dec. 4, 2013, pp. 1-21.

\* cited by examiner

400

There are four different detections for encrypted files to capture the four different features and time scopes. These are:

| | Tenant API spikes 134a | User API spikes 134b | Tenant inline spikes 134c | User inline spikes 134d |
|---|---|---|---|---|
| Level to build models at 410 | Organization level | User level | Organization level | User level |
| Medium to grab files 420 | Via API connected to a corporate cloud application | Via API connected to a corporate cloud application | Via inline traffic from a user's machine | Via inline traffic from a user's machine |
| Probability Threshold 430 | < 0.001 | < 0.001 | < 0.001 | < 0.001 |
| Static Thresholds (if any) 440 | Daily value >= 5 | Daily value >= 5 | Daily value >= 5 | Daily value >= 5 |
| Minimum number of data points 450 | 1000 (user-days) | 20 (only one value per day) | 1000 (user-days) | 15 (only one value per day) |
| Minimum number of days 460 | 15 (only weekdays) | 20 (only weekdays) | 15 (only weekdays) | 15 (only weekdays) |

MACHINE LEARNING-BASED ENCRYPTED FILE CLASSIFICATION FOR IDENTIFYING ENCRYPTED DATA MOVEMENT

RELATED CASES

This application is a continuation of and claims priority to U.S. patent application Ser. No. 17/860,037, titled "ML-BASED ENCRYPTED FILE CLASSIFICATION FOR IDENTIFYING ENCRYPTED DATA MOVEMENT," filed Jul. 7, 2022, the contents of which is herein incorporated by reference in its entirety for all purposes.

This application is related to U.S. patent application Ser. No. 17/860,035, titled "Training an Encrypted File Classifier," filed Jul. 7, 2022, which is herein incorporated by reference in its entirety for all purposes.

INCORPORATIONS

The following materials are incorporated by reference in this filing:

"KDE Hyper Parameter Determination," Yi Zhang et al., Netskope, Inc.

U.S. Non Provisional application Ser. No. 15/256,483, titled "Machine Learning Based Anomaly Detection," filed Sep. 2, 2016, issued as U.S. Pat. No. 10,270,788 on Apr. 23, 2019;

U.S. Non Provisional application Ser. No. 16/389,861, titled "Machine Learning Based Anomaly Detection," filed Apr. 19, 2019, issued as U.S. Pat. No. 11,025,653 on Jun. 1, 2021;

U.S. Non Provisional application Ser. No. 14/198,508, titled "Security For Network Delivered Services," filed Mar. 5, 2014, issued as U.S. Pat. No. 9,270,765 on Feb. 23, 2016;

U.S. Non-Provisional patent application Ser. No. 17/326,240, titled "SCORING CONFIDENCE IN USER COMPLIANCE WITH AN ORGANIZATION'S SECURITY POLICIES," filed on May 20, 2021, issued as U.S. Pat. No. 11,310,282 on Apr. 19, 2022;

U.S. Non-Provisional patent application Ser. No. 17/326,243, titled "Calibrating User Confidence in Compliance with An Organization's Security Policies," filed on May 20, 2021, issued as U.S. Pat. No. 11,481,709 on Oct. 25, 2022;

U.S. Non-Provisional patent application Ser. No. 17/326,253, titled "Reducing False Detection of Anomalous User Behavior on a Computer Network," filed on May 20, 2021, issued as U.S. Pat. No. 11,444,951 on Sep. 13, 2022;

U.S. Non Provisional application Ser. No. 15/368,240 titled "Systems and Methods of Enforcing Multi-Part Policies on Data-Deficient Transactions of Cloud Computing Services," filed Dec. 2, 2016, issued as U.S. Pat. No. 10,826,940 on Nov. 3, 2020);

U.S. Provisional Application 62/307,305, titled "Systems and Methods of Enforcing Multi-Part Policies on Data-Deficient Transactions of Cloud Computing Services," filed Mar. 11, 2016;

"Cloud Security for Dummies, Netskope Special Edition" by Cheng, Ithal, Narayanaswamy, and Malmskog, John Wiley & Sons, Inc. 2015;

"Netskope Introspection" by Netskope, Inc.;

"Data Loss Prevention and Monitoring in the Cloud" by Netskope, Inc.;

"The 5 Steps to Cloud Confidence" by Netskope, Inc.;

"Netskope Active Cloud DLP" by Netskope, Inc.;

"Repave the Cloud-Data Breach Collision Course" by Netskope, Inc.; and

"Netskope Cloud Confidence Index™" by Netskope, Inc.

FIELD OF THE TECHNOLOGY DISCLOSED

The technology disclosed generally relates to behavior analytics for quantifying overall riskiness of a user so that security administrators can readily identify the top risky users and take appropriate actions. More specifically, the disclosed technology relates to determining or updating a user confidence score that reflects user behavior anomalies that indicate potential threats, through machine learning and statistical analysis. The technology disclosed relates specifically to detecting movement of encrypted data and to detecting data exfiltration via classification of transferred files as encrypted or unencrypted.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

It is beneficial to an organization's network security to detect encrypted files.

The internet brings benefits to most organizations, but with those benefits also come risks. Organizations risk exfiltration of valuable data via communication network connected to the cloud. Valuable data may include trade secret data, ongoing R&D, strategic plans, insider data, etc. Data exfiltration may be carried out internally by disgruntled organization members or attackers (aka "hackers") that are external to the organization but who have compromised control of a computer/computer account within the organization's network.

The benefits of the internet are such that blocking all outbound communications is usually unacceptable. Email attachments, file upload, and such are sometimes part of normal network activity, and thus blocking such communication is usually detrimental to an organization's ability to function. Thus, rather than block all external-bound communications, most organizations may instead prefer to reviewing outbound communications for exfiltrated data and taking targeted action when the risk of exfiltration is high.

It is also usually unacceptable for network traffic to be slowed by the security software. Milliseconds of latency can cripple performance. For example, using a 100 Mbps connection, a 50 ms latency (half the time of an eye-blink) causes the effective upload speed to become 10 Mbps.

The technology that is designed to stop data exfiltration is called data loss prevention (DLP). For example, DLP may be assisted by network software that recognizes the file types of files being sent to the cloud, and inspects the file content based on the file type. An example of such network software is Microfocus KeyView. KeyView is a standalone file format detection, content decryption, text extraction, subfile processing, non-native rendering, and structured export solution. Other off-the shelf software that inspects file content based on file type, and provide similar services may also be used for DLP.

One technique that exfiltrators use to attempt to defeat DLP is encrypting the files to be exfiltrated. New encryption methods used to encrypt a file may cause the file type to be unrecognized by the network software. Additionally or alternatively, the file type may be recognized but encryption renders the file content unavailable for inspection (e.g., and encrypted zip file may be recognized as a zip, but the content cannot be decompressed unless one has a password).

Additionally, organizations also run the risk of ransomware. Ransomware is malware designed to deny an organization (or its users) access to their own files, by encrypting the organization's files. The file access is ransomed by the attackers, who promise to provide an encryption key in exchange for money.

An opportunity arises for detecting exfiltration designed to defeat data loss protection (DLP) by encryption before evaluation. An opportunity also arises for training an encryption classifier that classifies a file representation of a file being transferred as encrypted or not encrypted. An opportunity also arises to detect ransomware-encrypted devices.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 illustrates a table of four exemplary detections for encrypted files that may be constructed by adjustable parameters and may be used as data export trends.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The act of exporting encrypted files across a network may itself suggest that the user or the user's equipment is involved in exfiltration.

There is a need to quantify the overall riskiness of a user so that security administrators at an enterprise can readily identify the risky users and take appropriate actions, such as blocking access to sensitive files and stopping intrusion attacks.

The disclosed technology solves the technical problem of detecting encrypted files and detecting movement of encrypted files over an organization's network.

The disclosed technology also uses behavior analytics to uncover anomalous user behavior and assess how risky or trustworthy a user is, for detecting and blocking malicious insiders and compromised accounts to detect and block data exfiltration.

The disclosed technology also enables calibration of a user confidence or risk score that expresses evaluation of user behavior that was not compliant with an organization's security policies.

Modern cryptography techniques are immune to such attacks because they do not encode information at the character level and because the encoding techniques are designed to not provide information when manipulating data at the character-level. In fact, most modern cryptography techniques render the data to be apparently random when analyzed by classic attacks such as character frequency, pairwise frequency, alphabetic substitution, etc.

An encrypted file is decrypted to reveal plain text that a human can read and make sense of. Many modern encryption methods transform plain text into a symbol sequences that appears to be nearly random, which leaves little or no clues as to the original text or the manner of encryption. For instance, unlike substitution cyphers, modern encryption masks the high frequency of individual letters, such as "e" and "s," blank spaces, and of common words such as "the" and "of." Some encrypted files are not readily detected by the technology disclosed, such as files encoded by steganography.

An example system for detecting exfiltration designed to defeat DLP by encryption before evaluation, and for training an encryption classifier that classifies a file representation of a file being transferred as encrypted or not encrypted is described next.

Architecture

Figure 1:
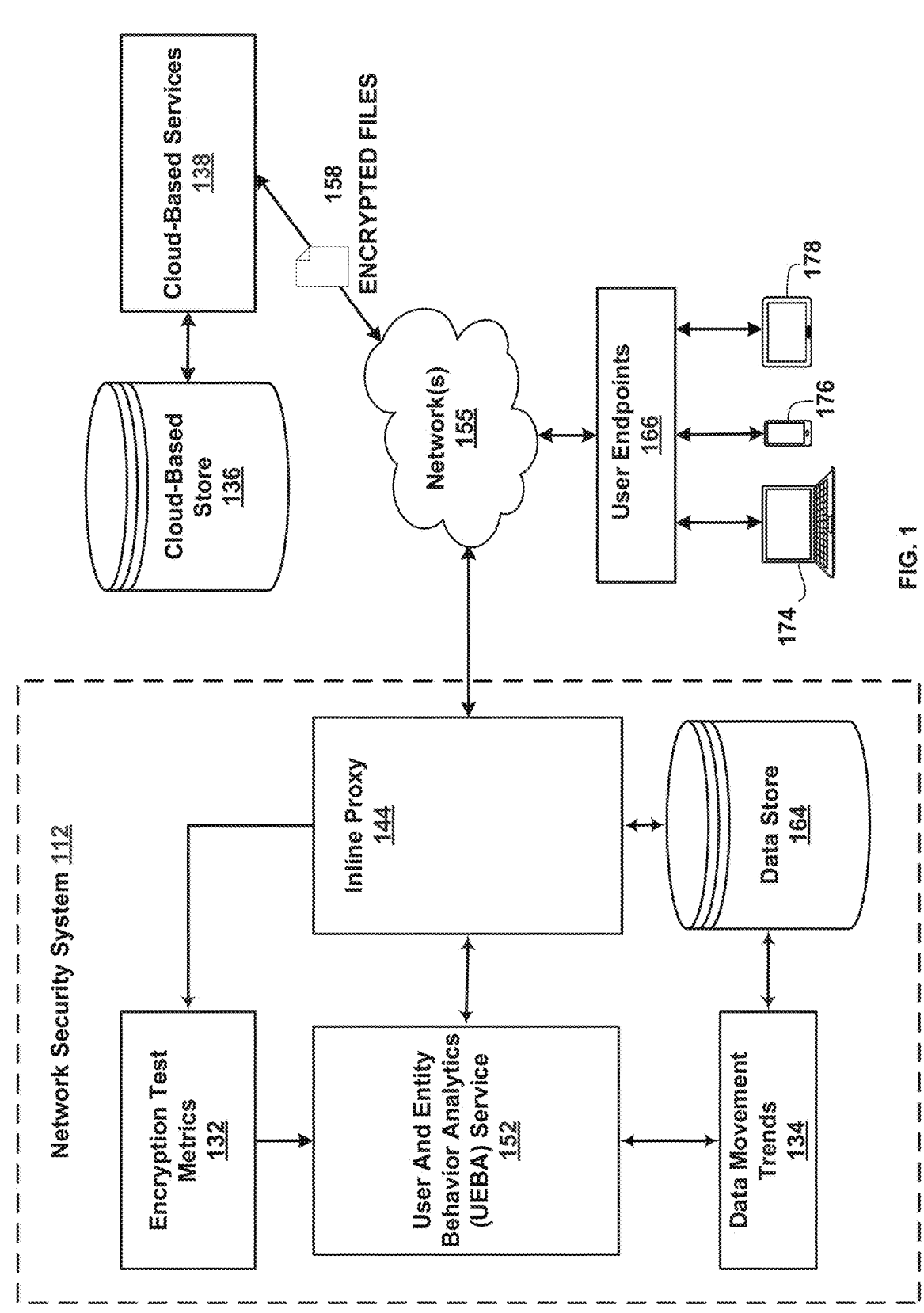
FIG. 1 illustrates an architectural level schematic of a system for detecting exfiltration designed to defeat data loss protection (DLP) by encryption before evaluation, and for training an encryption classifier that classifies a file representation of a file being transferred as encrypted or not encrypted, in accordance with an implementation of the technology disclosed.

FIG. 1 shows an architectural level schematic of a system 100 for detecting data exfiltration via classification of transferred files as encrypted or unencrypted. System 100 also includes functionality for detecting phishing via redirected or obscured URL links and downloaded HTML in real time. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes system 100 including the endpoints 166. User endpoints 166 may include devices such as computers 174, smart phones 176, and computer tablets 178, which provide access and interact with data stored on a cloud-based store 136 and cloud-based services 138. In another organization network, organization users may utilize additional devices. An inline proxy 144 is interposed between the user endpoints 166 and the cloud-based services 138 through the network 155 and particularly through a network security system (NSS) 112 including test metrics 132, Data Export Trends 134, a User and Entity Behavior Analytics (UEBA) 152 service, a data store 164, which will be described in more detail. The in-line proxy 144 is accessible through network 155, as part of the network security system 112. The in-line proxy 144 provides traffic monitoring and control between the user endpoints 166, the cloud-based store 136 and other cloud-based services 138. The in-line proxy 144 collects information about files transmitted over network 155 by individual users, including encrypted files 158 and can store the information in data store 164. The system for detecting data exfiltration is described in detail below. The in-line proxy 144 monitors the network traffic between user endpoints 166 and cloud-based services 138, particularly to enforce network security policies including data loss prevention (DLP) policies and protocols. UEBA 152 checks the database record of file traffic found sufficiently suspicious, via the disclosed detecting of encrypted file movement, and this traffic is blocked.

For detecting data exfiltration in real time, in-line proxy 144, positioned between the user endpoints 166 and the cloud-based storage platform, inspects and forwards incoming traffic to a UEBA service, which is described below. Traffic containing encrypted files 158 may be blocked and/or quarantined for further inspection.

Continuing with the description of FIG. 1, cloud-based services 138 includes cloud-based hosting services, web email services, video, messaging, and voice call services, streaming services, file transfer services, and cloud-based storage service. Network security system 112 connects to user endpoints 166 and cloud-based services 138 via public network 155. Data store 164 stores lists of malicious links and signatures from malicious URLs. The signatures are used to detect malicious links, typically by matching part or all of a URL or a compact hash thereof. Data store 164 stores information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based services 138. Non-structured data, such as free text, can also be provided by, and targeted back to cloud-based services 138. Both structured and non-structured data are capable of being stored in a semi-structured data format like a JSON (JavaScript Object Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store like Apache Cassandra™, Google's Bigtable™, HBase™, Voldemort™, CouchDB™, MongoDB™, Redis™, Riak™, Neo4j™, etc., which stores the parsed JSON objects using key spaces that are equivalent to a database in SQL. Each key space is divided into column families that are similar to tables and comprise of rows and sets of columns.

Continuing further with the description of FIG. 1, system 100 can include any number of cloud-based services 138: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video, and messaging multimedia communication sessions such as instant message over Internet Protocol (IP) and mobile phone calling over LTE (VOLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™.

In the interconnection of the elements of system 100, network 155 couples computers, tablets and mobile devices, cloud-based hosting service, web email services, video, messaging and voice call services, streaming services, file transfer services, cloud-based storage service 136 and network security system 112 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, network security system 112 includes data store 164 which can include one or more computers and computer systems coupled in communication with one another. They can also be one or more virtual computing and/or storage resources. For example, network security system 112 can be one or more Amazon EC2 instances and data store 164 can be Amazon S3™ storage. Other computing-as-service platforms such as Rackspace, Heroku or Force.com from Salesforce could be used rather than implementing network security system 112 on direct physical computers or traditional virtual machines. Additionally, one or more engines can be used, and one or more points of presence (POPs) can be established to implement the security functions. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Modern cryptography (from the 1970s, and onward) encrypts text data such that the cyphertext provides no statistical characteristics that can be used in classic cryptography. As discussed above, frequency analysis, character distribution, pairwise analysis, and so forth, will all apparently provide little or no additional information to distinguish the cyphertext from random data. As such, analysis that determines that a transferred file appears to contain "random" data may itself suggest that the file is encrypted. The following figure provides more detail to the system components that classifies whether or not a file is encrypted.

NSS and UEBA

Figure 2:
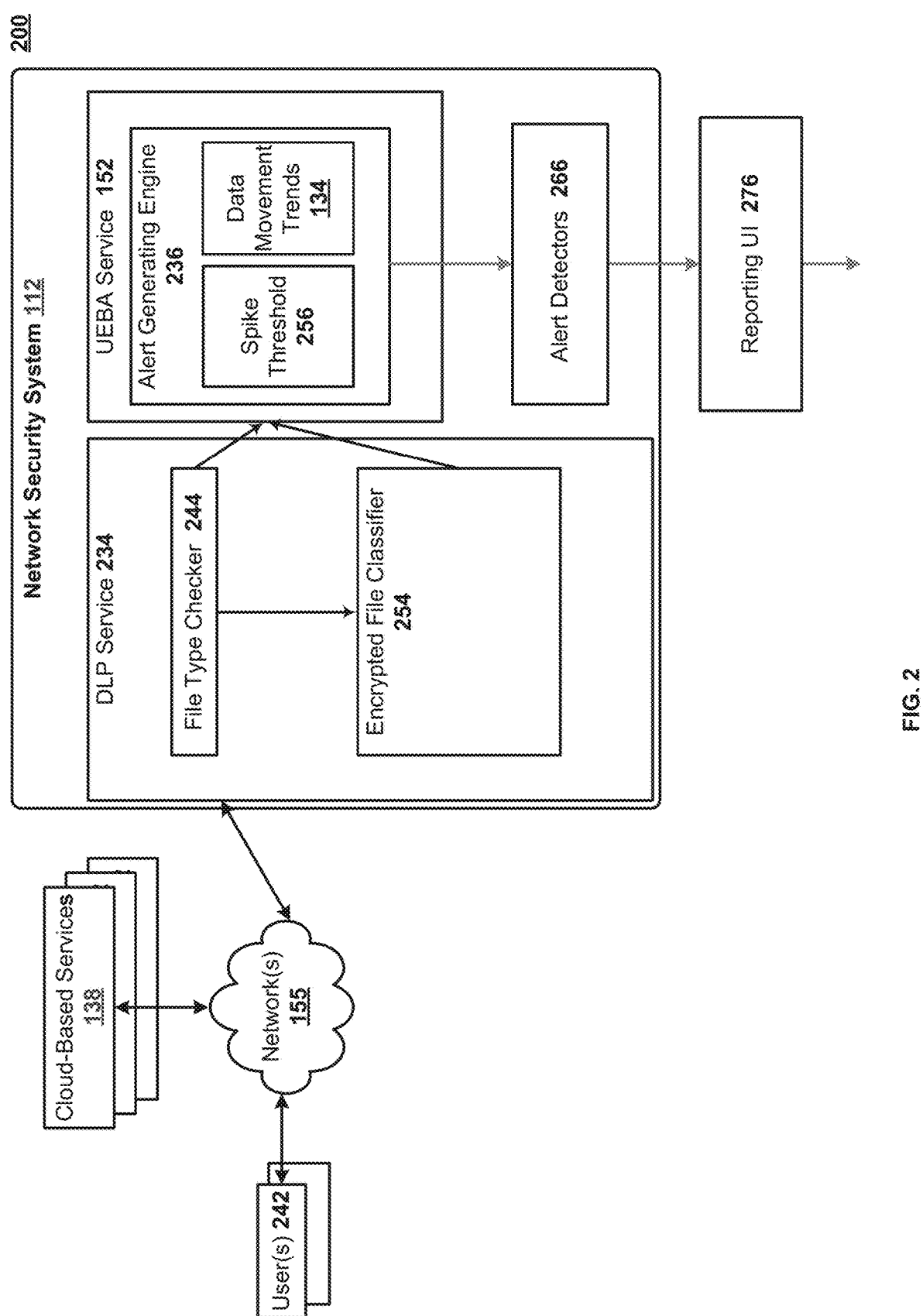
FIG. 2 illustrates a high-level block diagram of a Netskope Security System that provides Data Loss Prevention and User and Entity Behavior Analytics services.

FIG. 2 is a block diagram that provides more detail about the User and Entity Behavior Analytics service, in the context of a Network Security System.

Block diagram 200 illustrates one or more users 242 (through one of user endpoints 116), cloud-based services 138 via a secure tunnel (not shown), and NSS 112. NSS 112 contains UEBA Service 152. UEBA Service 152 contains file type checker 244, encrypted file classifier 254 that evaluates, based on two or more tests for randomness 132a-e, described in more detail below, whether a file is likely to be encrypted. UEBA 152 also contains spike threshold 256, and which uses data export trends 134 to determine when a spike in encrypted traffic occurred. Generated alerts are reported by reporting UI 276.

More specifically, one of more users sends files across network 155 to cloud-based services 138.

These transmissions may be benign; members of an organization may often send archives of files (e.g., zip files) or images (e.g. .jpg.) as part of work product, sales, or collaboration with people external to the organization. The increased use of cloud-resources has given rise to users internal to an organization who collaborate with each other. For example, Slack channels are conversational channels used by members of an organization, but which are hosted by Slack.com.

When files are transmitted by user 242 to cloud-based services 138, they are intercepted by NSS 112 and passed to DLP service 234 to determine whether sensitive data occurs. The steps of investigating the intercepted file may depend upon the type of the file being transferred (e.g., image data may be subject to image steganography analysis whereas a text-based format might not benefit from such an approach). Such steps may be optionally performed by file type checker 244.

Where the option of not including file type checker 244 is taken, where the file type cannot be determined by file type checker 244, or where irregularities in investigating a file occurs by file type checker 244, metadata about the file may be instead determined. Specific to this example, the intercepted file (or fraction of the file) is provided to encrypted file classifier 254. Encrypted file classifier 254 runs a plurality of tests to determine the apparent randomness of "characters" in a file. In some embodiments, the entire file may be supplied to the classifier. However, in many organizational environments, accuracy must be weighed against performance; although exfiltration of secret or sensitive information may be detrimental to an organization in the long term, severely curtailing the throughput of outbound traffic may curtail the organization's ability to effectively use the network as a whole.

In any case, whether by encrypted file classifier 254 alone or in tandem with other tools that may incidentally determine the encryption state of a file such as file type checker 244, DLP service 234 provides a determination of whether each file exfiltrated via network 155 is encrypted or not. This evaluation is provided to UEBA Service 152.

User and Entity Behavior Analytics (UEBA), in general, tracks typical behavior for users in an organization, and generates security alerts if a user or an entity behaves anomalously. Such different behavior is detected by comparing the user/entity with its own history, and/or the history of the entity such as the organization.

Here, amongst other data analytics, UEBA service 152 through alert generating engine 236. Alert generating engine 236 employs evaluation of encryption by DLP service 234 to determine the normal file movement pattern for a user, determine the normal file movement pattern for the organization. Information that reflects the normal file movement patterns are stored as data movement trends 134. Various detections to establish data movement trends 134 are described below in reference to FIG. 4. Alert generating engine 236 also determines if a user's encrypted file movement represents a spike in the normal file movement pattern by comparing the user's encrypted file movement rates with a spike threshold. A spike threshold could be as simple as a static value as variance score in accordance with a statistical test. The spike threshold is more likely to be determined by a complex set of factors that result in adjustment of the threshold, such as current events, seasonality, historic data distribution, and the like. One type of test that could be used is the Kernal Density Estimation (KDE) test. In any case, UEBA service 152 may fire an alert containing a user confidence index (UCI) score using alert generating engine 236 when that threshold is exceeded.

A simple example of this is if a user downloads 5 files per day, the UEBA model would count the number of files being downloaded for a given day and at the end of day, tally the number 5 to save as a threshold. This would be the user's baseline for downloads of files. If the user suddenly downloads 20 files in a day, the UEBA engine would perform a probability test of this occurring compared to the baseline of 5. Since the probability of the user downloading 20 files would be low, the UEBA would raise an alert.

If alert generating engine 236 generates an alert for a user, alert detectors 266 may react to that alert and adjust the UCI for that user. For example, a user may have a current UCI of 1000. Suppose an encrypted data movement spike detector generates a penalty of 100 and an alert. Alert detectors 266 listen to the alert and reduce the current UCI for the user to 900.

More specifically, the alerts have weights that are subject to a decay factor that attenuates the alert weights as time passes. User risk score is used to reflect the "risk level" of each user, and therefore the alerts which are not associated with the user are not considered in the risk score calculation. User confidence index (UCI) is 1000 minus the risk score, in one implementation. Risk Score is calculated based on alerts associated with users. It reflects the severity of alerts, and decays over a period of time. The higher the risk score, the more suspicious the user is. Risk score is calculated as shown below.

$$RiskScore = \sum S_i * f_i$$

$S_i$ is the score for a single alert based on the severity level, and $f_i$ is a decay factor for an alert based on when the alert occurred. Time decay factor $f_i$ is used to linearly decay the risk score in one example implementation, in the window of 7 days. In this example, $f_i$ can be 1/7, 2/7, 3/7, 4/7, 5/7, 6/7, and 1 depends on the time of the alerts. Final Risk Score is capped at 1000, in one implementation described herein. The final risk score could be capped differently in another implementation. An alert severity weight is assigned to each alert based on its severity level.

A user's reduced UCI can invoke a variety of responses. Those responses may include increased monitoring of the user's traffic for file encryption, blocking the traffic, investigation of the user's device as potentially compromised by malware (including, but not limited to, ransomware) and/or reporting the event via reporting User Interface (UI) 276.

Next, the disclosure sets forth different tests that may be used by encrypted file classifier 254.

Tests of Randomness and Classifier

Figure 3:
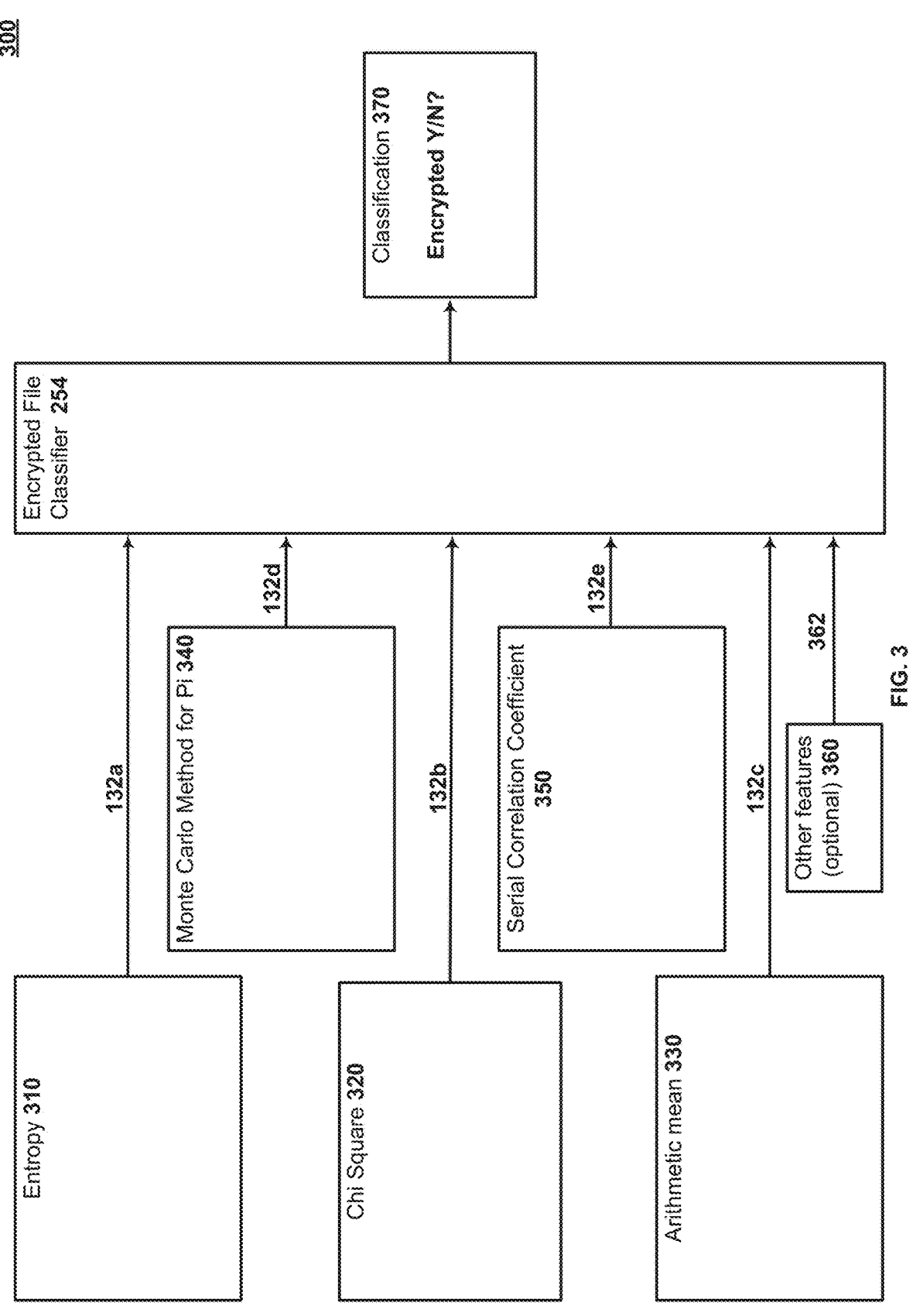
FIG. 3 illustrates different tests to determine randomness, and the results of those tests being used by a classifier.

FIG. 3 is a block diagram that illustrates different tests to determine randomness as an indicator of encryption, and how results of tests are used as input to a classifier.

Block diagram 300 has tests including entropy 310, chi square 320, arithmetic mean 330, Monte Carlo for pi 340, and serial correlation coefficient 350, other features 360, encryption test metrics 132*a-e*, and other features 362, encrypted file classifier 254, and classification 370.

A few vocabulary terms are useful to set out. For purposes of this disclosure, a "character" is a fixed-size unit of raw data. The use of the term "character" alone does not limit either of the encoding of a specific quantity of bits of data or the file type. For example, if a character is a single byte, then there are 256 potential characters, with values ranging from 0 through 255. By contrast, a 7-bit character would have values ranging from 0-127.

Entropy

Entropy test 310 measures Information Entropy (aka Shannon Entropy) of the information density of the contents of the file expressed as a number of bits per character. The compression of the file is unlikely to reduce its size if it has large entropy.

Entropy is calculated as:

$$H(X) = -\sum_{i=0}^{n-1} P(x_i)\log_b P(x_i)$$

Where n is the number of possible characters, $x_i$ is the particular character, $P(x_i)$ is the probability that x occurs, and log base b is the unit of data.

As an example, assume a file sample of six bytes is taken, where a character is a byte. Also assume the sample bytes are as follows:

| Offset | Decimal value of character |
|---|---|
| 0 | 255 |
| 1 | 10 |
| 2 | 255 |
| 3 | 76 |

-continued

| Offset | Decimal value of character |
|---|---|
| 4 | 10 |
| 5 | 255 |

The probability of each character occurring is as follows:

| Decimal value | Probability |
|---|---|
| 10 | 2/6 |
| 76 | 1/6 |
| 255 | 3/6 |

Calculating the unit of data as bits (so b=2), Entropy H is calculated as $-((\frac{1}{2})(-1)+(\frac{1}{6})-2.585+(\frac{1}{3})(-1.585))=-0.5-0.43-0.52=1.46$. This is a much lower degree of Entropy H than if the six characters were all different.

A high degree of entropy suggests that the sequence of characters is random. Test metric 132*a* is the result of entropy test 310.

Chi-Square Test

Chi-square test 320 is extremely sensitive to errors in pseudorandom sequence generators. The chi-square distribution is calculated for the stream of bytes in the file and expressed as an absolute number and a percentage which indicates how frequently a truly random sequence would exceed the value calculated, as follows:

$$\chi^2 = \sum_{i=1}^{k} \frac{(O_i - E_i)^2}{E_i}$$

Where O is the observed frequency of the i-th character in the file sample, E is an expected value of the i-th character, k is the number of different characters.

Chi-square test 320 compares the distribution of characters against a distribution of characters for a random sequence. It would be expected that a truly random sequence is evenly distributed amongst all possible characters in the domain k, so the frequency for each character would be 1/k.

For example, assuming that a character is a single byte, there are 256 possible characters. For a truly random sequence, as the total number of characters in the sequence increases, the distribution would be expected to show that each possible character is present $\frac{1}{256}$ (or approximately 0.39%) of the total number of characters. Thus, each E; is slightly more than 0.0039. Similarly, the observed distribution of characters of a file sample is used to determine $O_i$.

Degrees of Freedom (DF) is k−1. Again, k is the number of possible alternative values of a character. In the current example, DF is 255.

After determining the chi-square value, a table is selected according to the degrees of freedom DF, the chi square value compared to the table. Sample chi square values and corresponding percentages, aka area under the curve, are given below for DF values ranging from 1 to 255.

| DF | .01 | .05 | .10 | .9 | .95 | .99 |
|---|---|---|---|---|---|---|
| | | | p | | | |
| 1 | 6.635 | 3.841 | 2.706 | .016 | .004 | 0 |
| 3 | 11.345 | 7.815 | 6.251 | 0.584 | 0.352 | 0.115 |

-continued

| | | | p | | | |
|---|---|---|---|---|---|---|
| DF | .01 | .05 | .10 | .9 | .95 | .99 |
| 7 | 18.475 | 14.067 | 12.017 | 2.833 | 2.167 | 1.239 |
| 15 | 30.578 | 24.996 | 22.307 | 8.547 | 7.261 | 5.229 |
| 31 | 52.191 | 44.985 | 41.422 | 21.434 | 19.281 | 15.655 |
| 63 | 92.010 | 82.529 | 77.745 | 49.111 | 45.741 | 39.855 |
| 127 | 166.987 | 154.302 | 147.805 | 107.051 | 101.970 | 92.887 |
| 255 | 310.457 | 293.248 | 284.336 | 226.520 | 219.025 | 205.420 |

The percentage as the degree to which the sequence tested is suspected of being non-random, within testable ranges. In an example, if the percentage is greater than 99% or less than 1%, the sequence is almost certainly not random. If the percentage is between 99% and 95% or between 1% and 5%, the sequence is suspect. Percentages between 90% and 95%, 5% and 10% indicate the sequence is "almost suspect."

Test metric 132$b$ is the result of the chi square test.

Arithmetic Mean Test

The arithmetic mean test is the result of summing all the characters in the file sample and finding the mean value. As expected, the mean $$\text{the mean value} = \frac{\sum_{i=0}^{n-1} c_i}{n},$$

where n is the number of characters in the file sample and $c_i$ is the bitwise value of the ith character in the file sample.

If the data content of the file is close to random and each character is a byte, the arithmetic mean of each byte should be about 127.5 (half of 255) assuming $c_i$ is unsigned and assuming that the size of a character is 8 bits.

For example, assume a file sample contains the following:

| Offset | Unsigned decimal value of character |
|---|---|
| 0 | 255 |
| 1 | 10 |
| 2 | 255 |
| 3 | 76 |
| 4 | 10 |
| 5 | 255 |
| . . . | |
| 102,399 | 8 |

The summation of the 102,400 values found at each offset of the file sample is summed, then divided by 102,400. The mean value may be calculated by (255+10+255+76+10+255 . . . 8)/102,400.

The proximity of the mean value to 127.5 reflects whether the file sample represents a random sequence. If the mean departs from this value, there is a bias in values, such as the bias towards frequent occurrence in English of "e" and "s."

Test metric 132$c$ is the result of arithmetic mean test.

Monte Carlo Value for Pi

In general, Monte Carlo algorithms are computer algorithms that depend on stochastic processes to converge to an answer (named after the Monte Carlo casino).

One such Monte Carlo algorithm can be used to calculate pi. For square of side length 2r, and a circle of radius is r, the area of the square is $A_{square}=4r^2$ and the area of the circle is $A_{circle}=\pi r^2$. Thus, dividing the area of a circle by the area of the square, then multiplying by 4, returns pi. Or in other words, pi=$4*A_{circle}/A_{square}$.

The Monte Carlo pi calculator place points within a square and determines how many of the points also are within a circumscribed circle. If 4*circle_count/square_count equals pi, the points are randomly distributed.

For the test disclosed here, fixed-sized blocks of data in the file sample are treated as cartesian coordinates, and the Monte Carlo method for pi algorithm is executed to determine a ratio between the points in both the circle and square (both defined by the same r), and points in just the square. In other words, if the percentage of coordinates would also fall into a circle approaches 78.53% (because pi/4 is approximately 0.7853), then the sequence is likely to be random.

A brief example using arbitrary file sample data is provided below.

Assume the following file sample data in the first six bytes:

| Offset | Binary Value | Decimal value |
|---|---|---|
| 0 | 00010001 | 17 |
| 1 | 00000000 | 0 |
| 2 | 11111111 | 255 |
| 3 | 00100101 | 37 |
| 4 | 01111110 | 126 |
| 5 | 01000000 | 64 |
| . . . | | |

In one mapping, six bytes are mapped to a single point, three bytes as a 24-bit X coordinate and three byte 24-bit Y coordinate. For 24 bits, r is half of the maximum value of an unsigned 24-bit integer. That is r=8,388,608. The example uses three bytes for each numeric value of coordinate. Thus, the x coordinate is 000100010000000011111111 in binary (or 1,114,367 in decimal) and the y coordinate is 001001010111111001000000 in binary (or 2,457,152 in decimal). One-, two-, or four-byte coordinates could be used, alternatively. The number of bits in a coordinate can be chosen to accommodate the ability of the hardware to determine whether a particular mapped point is within the circumscribed circle.

The mapped point is plotted in a cartesian plot with both axis values ranging from 0 through 16,777,215. It is determined whether the point falls within the circle or outside of the circle (in this particular case, the coordinate falls outside of the circle).

The process is repeated with the next six-byte block (represented by byte offsets 6-11 in the file sample), and until less than six-bytes remain.

If the ratio of numbers in the circle and 17,066 (the total number of points tested in a 100 KB file sample) is close to the value of pi divided by 4, then the Monte Carlo test for pi suggests that the file sample represents a random sequence.

Test metric 132$d$ is the result of Monte Carlo for pi test.

Serial Correlation Coefficient

In general, a serial correlation provides a coefficient within the range [−1, 1] that measures the extent that a previous event can be used to predict the next event. The equation for a correlation coefficient is:

$$r = \frac{\sum_{i=1}^{n-k} (x_i - \bar{x})(x_{i+k} - \bar{x})}{\sum_{i=1}^{n} (x_i - \bar{x})^2}$$

where $x_i$ is the i-th character in a first sequence, $\bar{x}$ is the mean of the first sequence, $y_i$ is the i-th character in a second sequence, $\bar{y}$ is the mean of the second sequence, n in the number of characters in the file sample, and k is a degree of lag.

A serial correlation is a correlation of a sequence measured against itself (with a degree of lag). For encrypted file classifier 254, this quantity measures the extent to which each character in the file depends upon the previous character.

For random sequences, this value will be close to zero. Wildly predictable data such as uncompressed bitmaps will exhibit serial correlation coefficients approaching 1.

Test metric 132*e* is the result of Serial Correlation Coefficient test.

Although it is possible for encrypted file classifier 254 to include as input only one encryption test metric 132*a-e*, it is usually desirable for encrypted file classifier 254 to employ the metrics resulting from more than one of tests 310-350 since some file types may be apparently random under some tests but not others. For example, a JPEG file may exhibit high entropy, but may be far from random as revealed by the chi-square test. Thus, employing a plurality of tests may provide additional features for encrypted file classifier 254 for enhanced accuracy.

Other Inputs

Test metrics 132 do not necessarily represent a closed set of input to encrypted file classifier 254. Tests of randomness other than those of 310-350 may be used to provide test metrics to encrypted file classifier 254.

Furthermore, other features 360, such as file features and datagram features, may be optionally provided both during classifier training and after classifier deployment to the organization's environment. For example, although each test of randomness described above may be provided with file samples that are usually of a fixed size, encrypted file classifier could also be provided with a value equal to the size of the transmitted file.

Another feature that could be provided is the file extension. File extensions that may strongly indicate encryption include pgp, locky (and variants), crypto, crypt8, psafe3, crypt7, ibak, cgp, cnc, ZIP, rz, 72, 124, zipx, gz, jsonlz4, rar. A rigorous and relatively expensive analysis of encryption could be avoided if it were determined that a compressed file type can be successfully decompressed to plain text. Compressed files that cannot be successfully decompressed are often encrypted and password protected.

Such features may be provided as additional feature input 362 to encrypted file classifier 254.

Classifier

Encrypted file classifier 254 can be either based on weighted score or based on machine learning. Machine learning variants may be a rule-based model, a tree-based model, or a machine learning model.

In one implementation, the model that is encrypted file classifier 254 is trained using LightGBM. LightGBM trains a tree-based algorithm that bins data in continuous ranges as discrete sets, combines mutually exclusive features, and biases training towards large gradients by training on all large gradients while sampling amongst small gradients.

The disclosed technology is tunable between performance and accuracy, based on the file size samples used as input. In experiments in which a classifier was trained via Light Gradient Boosting Machine (LightGBM) and used to predict whether a file was or was not encrypted, runtime evaluation of 1 MB-sized files required an overall runtime of 20 ms. However, adding 20 ms of latency for a file transfer over a network makes overall file transfer speeds too slow. Predictions that employ the first 100K of a file provided an overall runtime of 2.4 ms with average accuracy of 88%. Predictions that employ the first 10K of a file required an overall runtime of 0.6 ms, but prediction accuracy suffers.

Since runtime decreases linearly, those of ordinary skill may adjust the file sample size to achieve the desired balance between performance and accuracy. It is expected that different assortments of data will not change the linear relationship between file size and speed.

In one implementation, the model that is encrypted file classifier 254 is a multilayer perceptron (MLP). In another implementation, the model 254 is a feedforward neural network. In yet another implementation, the model 254 is a fully connected neural network. In a yet further implementation, the model 254 is a semantic segmentation neural network. In yet another further implementation, the model 254 is a generative adversarial network (GAN) (e.g., Cycle-GAN, StyleGAN, pixelRNN, text-2-image, DiscoGAN, IsGAN). In a yet another implementation, the model 254 includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, BERT, SpanBERT, ROBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-Dec-pLab, VisTR, SETR, Hand-Transformer, HOT-Net, METRO, Image Transformer, Taming transformer, Trans-GAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L-32), ACT+MKDD (L=16), SMCA, Efficient DETR, UP-DETR, UP-DETR, ViTB/16-FRCNN, VIT-B/16-FRCNN, PVT-Small+Retina-Net, Swin-T+RetinaNet, Swin-T+ATSS, PVT-Small+DETR, TNT-S+DETR, YOLOS-Ti, YOLOS-S, and YOLOS-B.

In one implementation, the model 254 is a convolution neural network (CNN) with a plurality of convolution layers. In another implementation, the model 254 is a recurrent neural network (RNN) such as a long short-term memory network (LSTM), bi-directional LSTM (Bi-LSTM), or a gated recurrent unit (GRU). In yet another implementation, the model 254 includes both a CNN and an RNN.

In yet other implementations, the model 254 can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The model 254 can use one or more loss functions such as logistic regression/log loss, multi-class cross-entropy/softmax loss, binary cross-entropy loss, mean-squared error loss, L1 loss, L2 loss, smooth L1 loss, and Huber loss. The model 254 can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The model 254 can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The model 254 can be a linear regression model, a logistic regression model, an Elastic Net model, a support vector machine (SVM), a random forest (RF), a decision tree, and a boosted decision tree (e.g., XGBoost or LightGBM), or some other tree-based logic (e.g., metric trees, kd-trees, R-trees, universal B-trees, X-trees, ball trees, locality sensitive hashes, and inverted indexes). The model 254 can be an ensemble of multiple models, in some implementations.

Encrypted file classifier 254 may be configured in a fashion to detect whether a file was encrypted encompassing, but not limited to, the algorithms of Advanced Encryption Standard ("AES"), Blowfish, Camellia, CAST, ChaCha, Data Encryption Standard ("DES"), RC2 and RC4. Encrypted file classifier 254 will operate irrespective of data encoding scheme used to, such as base 2, 8, 16, and 64.

Encrypted file classifier 254 provides, as an output, a binary classification 370 of the file represented by the file sample as either encrypted or not encrypted. This does not forestall other classifier implementations where other classifications (e.g., compressed) are determined.

That output may be used as part of DLP Service 234 to provide information about a transferred file to UEBA Service 152, as earlier described with respect to FIG. 2.

As earlier described, the information may be used to both de data movement trends. The elements and detections used to determine data movement trends are described next.

Detections and Features for File Movement Trends

FIG. 4 illustrates a table of four exemplary detections for encrypted files that may be constructed by adjustable parameters and may be used as data export trends.

Table 400 lists various parameters. The parameters include levels to build model 410, medium to grab files 420, probability threshold 430, static thresholds 440, minimum number of data points 450, minimum and number of days 460. Some or all of the adjustable elements may be employed to determine data movement trends 134.

Levels to build model 410 determines whether the behaviors of a group or individual is tracked. Although "organization" may typically be a large business entity, peers may also be designated. For example, an organization may contain a legal department, and the legal department may itself contain a patent-group and FDA-compliance group, and the user may be a patent agent in the patent-group. The technology disclosed could track at the level of the organization the legal department the patent-group, or the patent agent. No ceilings to organizational levels are imposed by the disclosed technology.

Medium to grab files 420 dictates how data is obtained for the detection. Data may hail from a cloud application and obtained via API, or by inline traffic that was intercepted from a user's machine to the cloud.

Probability threshold 430 dictates the accuracy of the detections. In these examples, each detection requires above 99.999% accuracy.

Static threshold 440 dictates a minimum number of file transfer events before qualifying as a data point. In these examples, the minimum is five, so a user that only sends three encrypted files would not be counted as a data point. Not setting a threshold (or setting a threshold to 0 or more) may allow broader data collection of events but may also subject the collection to anomalous data (e.g., if New Years is celebrated at the organization, the file transfer count for most users might be expected as 0).

Minimum number of data points 450 dictates the minimum number of user-days of data that must be collected. For individual users, this number is identical to a minimum number of days 460, briefly discussed below. For a group such as an organization, those numbers may be different. For example, for an organization of 75 people, it is possible to collect 1,000 user-days of data within 3 business weeks.

Minimum number of days 460 dictates the minimum time span that the data must be collected. A very large organization (e.g., 10,000 employees) might be able to meet the minimum number of data points 450 within a single day, but that manner of data collection might not accurately reflect what typical file transfer behavior for the organization is like.

Table 400 describes four exemplary detections of data export trends 134a-d in connection with parameters 410-460. The examples illustrate how minimum data points 450 and minimum days 460 are tightly coupled for detections having the level the model is built 410 being user level, but decoupled for detections having the level the model is built 410 being organization level. Additionally, the examples illustrate how the same medium to grab files 420 may serve organization or user monitoring.

UEBA 152 (from FIG. 2) may use the detections as part of a Kernal Density Estimation (KDE) algorithm. UEBA generates a probability value for every relevant event.

A person having ordinary skill in the art would be able extrapolate detections that are encompassed by the disclosed technology without specifically detailing the parameters of the elements. Moreover, a person having ordinary skill would recognize that not every parameter must be expressly set to meet the spirit of the disclosure.

Receiver Operating Curve

Figure 5:
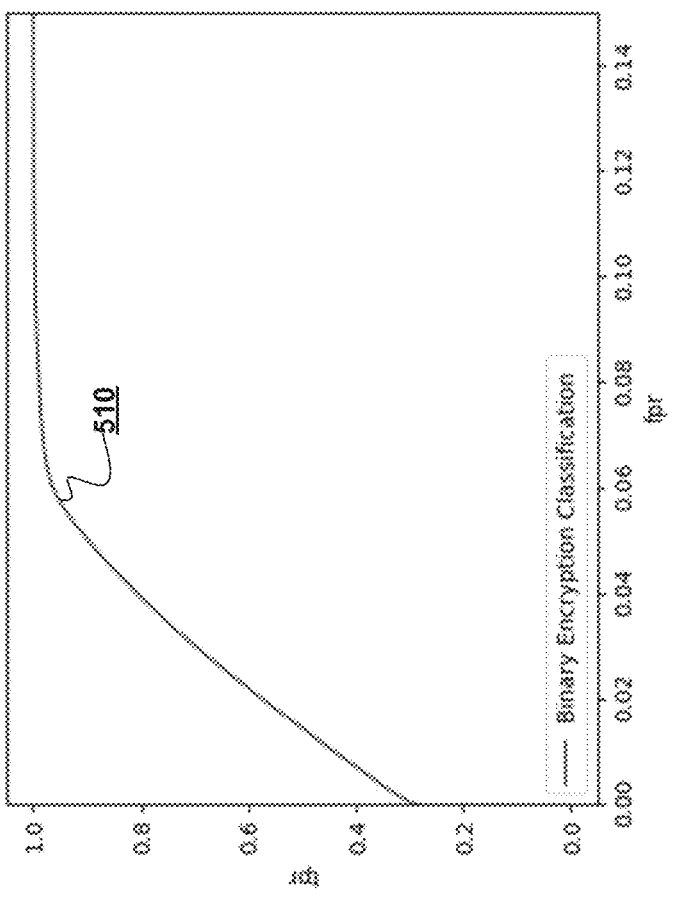
FIG. 5 illustrates the Receiver Operating Characteristic curve of a trained model.

FIG. 5 illustrates the receiver operating characteristic curves (ROC) for encrypted file classifier as described above.

ROC curves are plots of the true positive rate (TPR) as a function of the false positive rate (FPR) at various threshold settings. ROC curve 500 was produced by LightGBM trained using tests 310-350.

The ROC curve permits those having skill in the art to balance safety and performance. Here, the curve shows that a balanced approach between true positive rate and efficiency is found at slightly below 6% percent false positives 510, since that is where the curve is most pronounced. Those desiring to avoid raising alarms about user file transfers may choose to train a classifier to decrease false positives with a corresponding loss in correctly detecting encrypted files. Where data security is paramount, those may choose to train the classifier to be more sensitive to encrypted files with increased false positives.

Training

Figure 6:
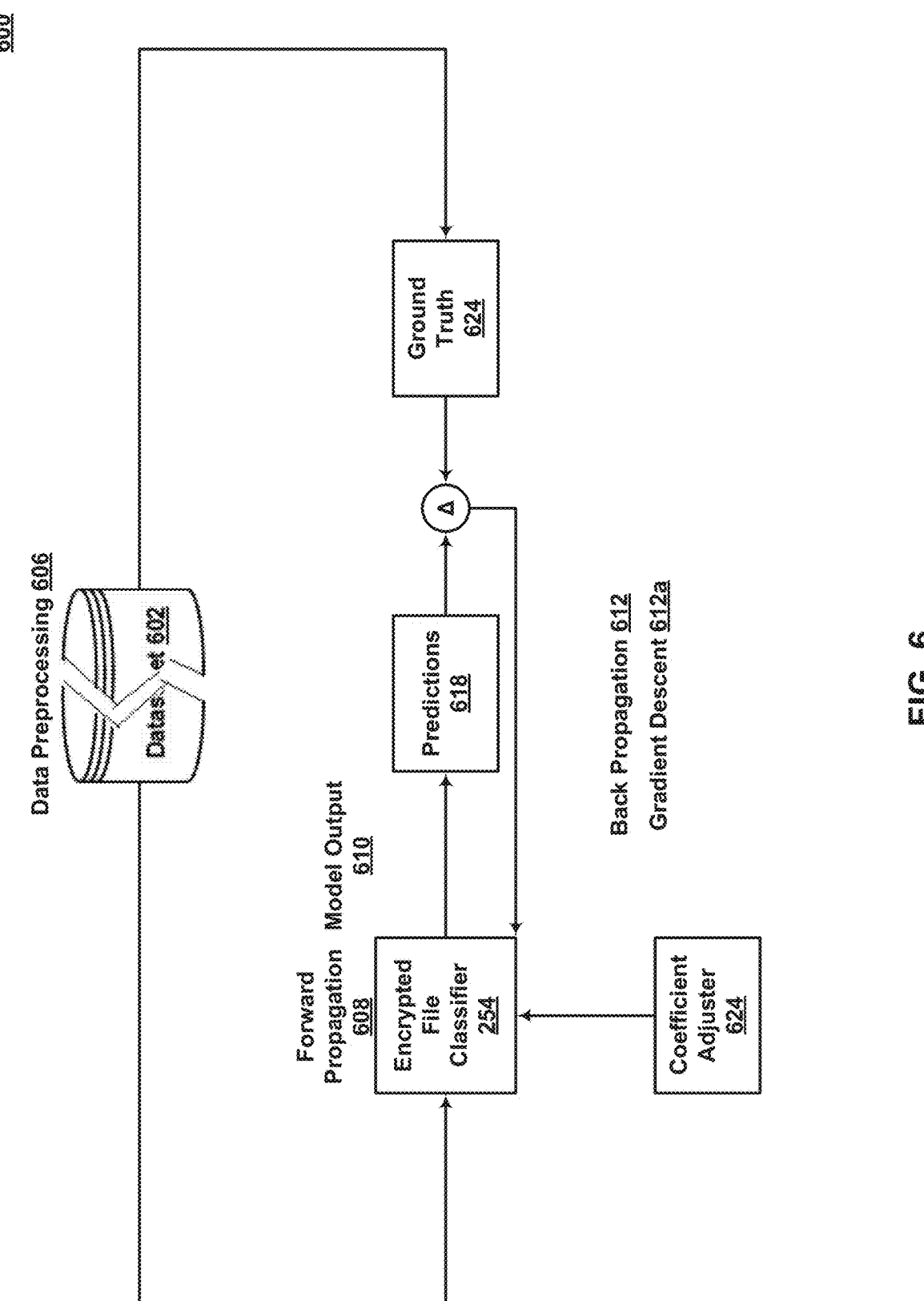
FIG. 6 illustrates a method of training a classifier to classify an encrypted file classifier that classifies whether is encrypted or not, using machine learning.

FIG. 6 illustrates a method of training a classifier 600 to classify an encrypted file classifier that classifies whether is encrypted or not, using machine learning.

Presented in the figure is dataset 602. The training set is comprised of file samples of encrypted files and unencrypted files. Also presented are encrypted file classifier 254, predictions 618, ground truth 624, and coefficient adjuster 626. Additionally presented are training steps: data preprocessing 606; and those of a typical training cycle: forward propagation 608, model output 610, and back propagation 612 including gradient descent 612a.

Data in dataset 602 are those that can represent files. Files may be images, text (which may be further organized as titles, sections, paragraphs, sentences, words, parts of speech), video, audio, or multimedia combinations thereof. The representation may include file samples, or whole files, or precalculated metrics of files, or metadata of files. The data may include labels that serve to identify whether data represents files that were encrypted or unencrypted.

Notably, the steps are merely illustrative, and do not limit the scope of the disclosure. Rather, the full implied understanding of those skilled in the art is captured in the disclosure. For example, with respect to potential classifier models, training a Kohonen Self Organizing Map (SOM) does not involve a back propagation step, yet a person having ordinary skill in the art would envisage the use of SOM as a model for encrypted file classifier 254 since a SOM is a known neural network model.

When initiating the training process, a system constructs encrypted file classifier 254 with random coefficients. Additionally, the validating data 804 is processed and the ground truth 624 for validating dataset 604a is created. In this particular example, ground truth 624 dictates whether particular files are indeed encrypted or not.

During forward propagation step 608, both individual entries training dataset 602a are input though one or more successive layers of nodes in cloud classifier 254. As the input "propagates" through layers of notes, it is adjusted. The final output of encrypted file classifier 254 is a score or vector.

During model output step 610, the score is measured against one or more threshold boundaries which define ranges of multi-dimensional regions. Depending upon which range or region that score or vector falls, the classifier performs prediction 618 as to whether the cloud traffic represented by the training input is encrypted or unencrypted.

During the back propagation step 612, coefficient adjuster 626 updates the coefficients in encrypted file classifier 254 based on some learning distance (typically symbolized as α). α is decayed between training iterations, so that coefficients do not swap back and forth two identical states in successive iterations.

The training system compares the predictions 618 (along with the scores or vectors used to craft those predictions) with the ground truth 624, and the differences between the prediction scores and ground truth are treated as a cost.

Back propagation 612 may involve a gradient descent 612a. A gradient descent optimization algorithm involves determining an overall loss of values of the ground truth as compared to the output layer of encrypted file classifier 254 used to generate predictions 618. Through gradient descent 612a, the training system determines direction of change (+ or −) to each coefficient, in order to minimize cost. As a first step, the immediately previous node layer of the neural network is evaluated, such that each node is assigned its contribution to the costs of the current layer. As a next step, those proportions are recorded as part of the cost for each node in the previous node layer. Each coefficient is checked against the nodes it immediately influences to determine its cost contribution. As a final step, the previous layer is considered the current layer, and the process iterates from the first step. The iterations continue until no more previous layers are available.

Finally, the training system determines if a new training iteration occurs. Training may stop after a threshold accuracy/cost is achieved, or after a maximum number of iterations occurs.

Computer System

Figure 7:
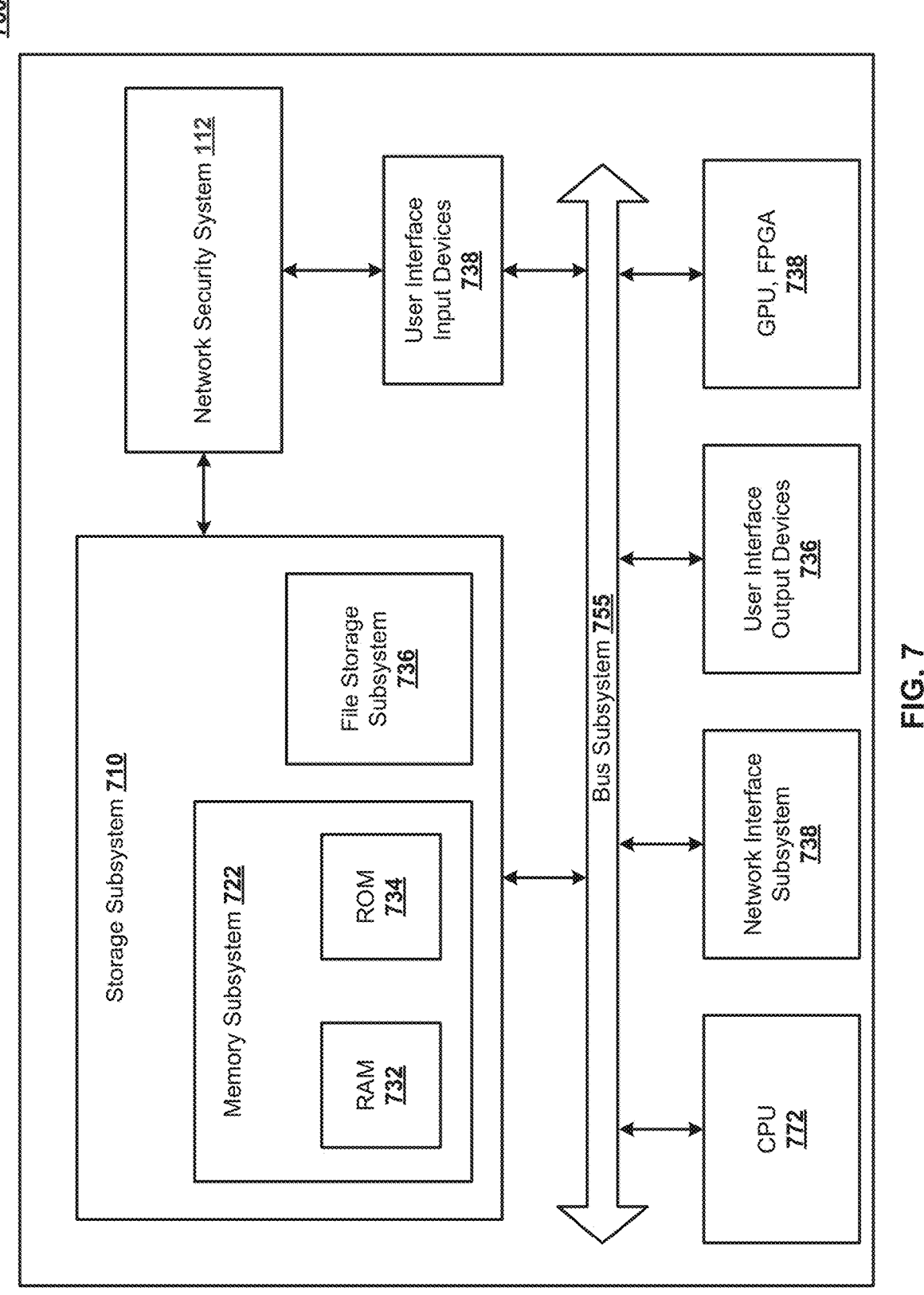
FIG. 7 is a simplified block diagram of a computer system that can be used for detecting exfiltration designed to defeat DLP by encryption before evaluation, and for training an encryption classifier that classifies a file representation of a file being transferred as encrypted or not encrypted, in accordance with an implementation of the disclosed technology.

FIG. 7 is a simplified block diagram of a computer system 700 that can be used for. Computer system 700 includes at least one central processing unit (CPU) 772 that communicates with a number of peripheral devices via bus subsystem 755, and cloud-based security system 153 for providing network security services described herein. These peripheral devices can include a storage subsystem 710 including, for example, memory devices and a file storage subsystem 736, user interface input devices 738, user interface output devices 776, and a network interface subsystem 774. The input and output devices allow user interaction with computer system 700. Network interface subsystem 774 provides an interface to outside networks, including an interface to corresponding interface devices in other computer systems.

In one implementation, cloud-based security system 153 of FIG. 1 is communicably linked to the storage subsystem 710 and the user interface input devices 738.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. Subsystem 778 can be graphics processing units (GPUs) or field-programmable gate arrays (FPGAs).

Memory subsystem 722 used in the storage subsystem 710 can include a number of memories including a main random access memory (RAM) 732 for storage of instructions and data during program execution and a read only memory (ROM) 734 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 710, or in other machines accessible by the processor.

Bus subsystem 755 provides a mechanism for letting the various components and subsystems of computer system 700 communicate with each other as intended. Although bus subsystem 1055 is shown schematically as a single bus, alternative implementations of the bus subsystem can use multiple buses.

Computer system 700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 700 depicted in FIG. 7 is intended only as a specific example for purposes of illustrating the preferred embodiments of the present disclosed technology. Many other configurations of computer system 700 are possible having more or less components than the computer system depicted in FIG. 7.

Particular Implementations

Some particular implementations and features for detecting exfiltration designed to defeat DLP by encryption before evaluation, and for training an encryption classifier that classifies a file representation of a file being transferred as encrypted or not encrypted are described in the following discussion.

In one disclosed implementation, a method of training an encryption classifier that classifies a file representation of a file being transferred as encrypted or not encrypted includes accessing a plurality of training sample files, each of which is accompanied by a label of encrypted or not encrypted, sampling a configurable number of bytes of each respective file, and generating features from the sampled bytes, including generating at least three of the following features. The features include a chi-square randomness test that measures a degree to which a distribution of the sampled bytes varies from an expected distribution of bytes from encrypted file, an arithmetic mean test that compares an arithmetic mean of the sampled bytes to an expected mean of bytes from encrypted files, a serial correlation coefficient test that calculates a serial correlation coefficient between pairs of successive sampled bytes, a Monte Carlo-Pi test that maps concatenated bytes as coordinates of a square and calculates a degree to which a proportion of the mapped concatenated bytes that fall within a circle circumscribed by the square varies from an expected proportion that corresponds to mapping from encrypted files, and a Shannon entropy test of randomness. The disclosed method also includes applying the generated features to train coefficients of a classifier algorithm to classify the sample files as encrypted or not encrypted, and saving the trained coefficients and classifier, whereby the classifier is trained to classify the sample files as encrypted or not encrypted.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In one implementation of the disclosed method, the classifier algorithm is a tree-based classifier algorithm. In another implementation, the classifier algorithm is a CNN. In a third implementation of the disclosed method, the classifier algorithm is a SVM.

Some implementations of the disclosed method include generating at least four of the features listed. Other implementations include generating all five of the features listed. For some implementations, the disclosed method includes generating and applying a file size feature.

Many implementations of the disclosed method include encryptions of trainings samples by at least five encryption protocols, including two or more of Advanced Encryption Standard ("AES"), Base64, Blowfish, Camellia, CAST, ChaCha, Data Encryption Standard ("DES"), RC2 and RC4.

For some implementations of the disclosed method, the configurable number of bytes is in a range of 10k bytes to 250k bytes. In other implementations, the configurable number of bytes is in a range of 100k bytes to a size of the file. In some implementations, the file size can be 100 MB.

What is claimed is:

1. A computer-implemented method, comprising:

intercepting, by a network security system server interposed on a network between a cloud-based application and a user endpoint associated with a user, movement of a plurality of files over the network to the cloud-based application;

classifying, with a classifier of the network security system server, each file of the plurality of files as one of encrypted or unencrypted, wherein:

the classifier is trained to classify each file based on analyzing sampled bytes of the respective file and a file type of the respective file; and the classifying comprises:

determining the file type of the respective file;

calculating metrics for the respective file based on analyzing the sampled bytes; and providing the metrics and the file type to the classifier trained to classify the respective file as encrypted or unencrypted based on the metrics and the file type;

counting, by the network security system server, a number of the plurality of files classified as encrypted and moved by the user during a predetermined time period;

detecting, by the network security system server, based on the counting, that the user has moved more encrypted files than a predetermined maximum number of encrypted files the user is allowed to move during the predetermined time period; and generating, by the network security system server in response to the detecting, an alert that the user has moved more encrypted files than the user is allowed.

2. The computer-implemented method of claim 1, wherein the calculating the metrics comprises calculating two or metrics selected from a chi-square metric, an arithmetic mean metric, a serial correlation coefficient metric, a Monte Carlo-Pi metric, and an entropy metric.

3. The computer-implemented method of claim 2, wherein:

the chi-square metric is based on a chi-square randomness test that measures a degree to which a distribution of the sampled bytes varies from an expected distribution of bytes from the respective file;

the arithmetic mean metric is based on an arithmetic mean test that compares an arithmetic mean of the sampled bytes to an expected mean of the bytes from the respective file;

the serial correlation coefficient metric is based on a serial correlation coefficient test that calculates a serial correlation coefficient between pairs of successive sampled bytes from the respective file;

the Monte Carlo-Pi metric is based on a Monte Carlo-Pi test that maps concatenated bytes as coordinates of a square and calculates a degree to which a proportion of the mapped concatenated bytes that fall within a circle circumscribed by the square varies from an expected proportion that corresponds to mapping from the respective file; and the entropy metric is based on a Shannon entropy test of randomness of the respective file.

4. The computer-implemented method of claim 1, further comprising:

analyzing file movement data for the user over a number of days; and establishing the predetermined maximum number of encrypted files allowed to be moved based on the analyzing.

5. The computer-implemented method of claim 4, wherein the number of days is at least 15 days.

6. The computer-implemented method of claim 1, further comprising:

analyzing file movement data for a plurality of users within an organization over a number of user-days; and establishing the predetermined maximum number of encrypted files allowed to be moved based on the analyzing.

7. The computer-implemented method of claim 6, wherein the number of user-days is at least one thousand (1000).

8. The computer-implemented method of claim 7, wherein the number of user-days includes both workdays and non-workdays.

9. The computer-implemented method of claim 1, further comprising:

intercepting first movement of a first subset of the plurality of files over an application programming interface (API) connection to the cloud-based application; and intercepting second movement of a second subset of the plurality of files via inline traffic associated with the user endpoint.

10. The computer-implemented method of claim 1, further comprising:

sampling the respective file to obtain the sampled bytes, wherein a size of the sampled bytes comprises between 10 KB and 250 KB of the respective file.

11. A network security system interposed on a network between a cloud-based application and a user endpoint associated with a user, the network security system comprising:

one or more processors; and a memory having stored thereon instructions that, upon execution by the one or more processors, cause the one or more processors to:

intercept movement of a plurality of files over the network to the cloud-based application;

classify, with a classifier, each file of the plurality of files as one of encrypted or unencrypted, wherein;

the classifier is trained to classify each file based on analyzing sampled bytes of the respective file and a file type of the respective file; and the instructions to classify comprise further instructions that, upon execution by the one or more processors, cause the one or more processors to:

determine the file type of the respective file;

calculate metrics for the respective file based on analyzing the sampled bytes; and provide the metrics and the file type to the classifier trained to classify the respective file as encrypted or unencrypted based on the metrics and the file type;

count a number of the plurality of files classified as encrypted and moved by the user during a predetermined time period;

detect, based on the counting, that the user has moved more encrypted files than a predetermined maximum number of encrypted files the user is allowed to move during the predetermined time period; and generate, in response to the detecting, an alert that the user has moved more encrypted files than the user is allowed.

12. The network security system of claim 11, wherein the instructions to calculate comprise further instructions that, upon execution by the one or more processors, cause the one or more processors to calculate two or more metrics selected from a chi-square metric, an arithmetic mean metric, a serial correlation coefficient metric, a Monte Carlo-Pi metric, and an entropy metric.

13. The network security system of claim 12, wherein:

the chi-square metric is based on a chi-square randomness test that measures a degree to which a distribution of the sampled bytes varies from an expected distribution of bytes from the respective file;

the arithmetic mean metric is based on an arithmetic mean test that compares an arithmetic mean of the sampled bytes to an expected mean of the bytes from the respective file;

the serial correlation coefficient metric is based on a serial correlation coefficient test that calculates a serial correlation coefficient between pairs of successive sampled bytes from the respective file;

the Monte Carlo-Pi metric is based on a Monte Carlo-Pi test that maps concatenated bytes as coordinates of a square and calculates a degree to which a proportion of the mapped concatenated bytes that fall within a circle circumscribed by the square varies from an expected proportion that corresponds to mapping from the respective file; and the entropy metric is based on a Shannon entropy test of randomness of the respective file.

14. The network security system of claim 11, wherein the instructions comprise further instructions that, upon execution by the one or more processors, cause the one or more processors to:

analyze file movement data for the user over a number of days; and establish the predetermined maximum number of encrypted files allowed to be moved based on the analyzing.

15. The network security system of claim 14, wherein the number of days is at least 15 days.

16. The network security system of claim 11, wherein the instructions comprise further instructions that, upon execution by the one or more processors, cause the one or more processors to:

analyze file movement data for a plurality of users within an organization over a number of user-days; and establish the predetermined maximum number of encrypted files allowed to be moved based on the analyzing.

17. The network security system of claim 16, wherein the number of user-days is at least one thousand (1000).

18. The network security system of claim 17, wherein the number of user-days includes both workdays and non-workdays.

19. The network security system of claim 11, wherein the instructions comprise further instructions that, upon execution by the one or more processors, cause the one or more processors to:

intercept first movement of a first subset of the plurality of files over an application programming interface (API) connection to the cloud-based application; and intercept second movement of a second subset of the plurality of files via inline traffic associated with the user endpoint.

20. The network security system of claim 11, wherein the instructions comprise further instructions that, upon execution by the one or more processors, cause the one or more processors to:

sample the respective file to obtain the sampled bytes, wherein a size of the sampled bytes comprises between 10 KB and 250 KB of the respective file.

\* \* \* \* \*